United States Patent [19]

Meijer et al.

[11] Patent Number: 5,559,162

[45] Date of Patent: Sep. 24, 1996

[54] POLYMERIC PEROXYCARBONATES AND PROCESS FOR MAKING THEM

[75] Inventors: John Meijer; Petrus J. T. Alferink, both of Deventer, Netherlands

[73] Assignee: Akzo Nobel, NV, Arnhem, Netherlands

[21] Appl. No.: 379,636

[22] PCT Filed: Jul. 26, 1993

[86] PCT No.: PCT/EP93/01997

§ 371 Date: Feb. 23, 1995

§ 102(e) Date: Feb. 23, 1995

[87] PCT Pub. No.: WO94/03525

PCT Pub. Date: Feb. 17, 1994

[30] Foreign Application Priority Data

Aug. 7, 1992 [EP] European Pat. Off. ............... 92202441

[51] Int. Cl.[6] ........................................................ C08F 2/46
[52] U.S. Cl. ......................... 522/60; 522/904; 528/196; 525/370; 525/371; 524/800; 524/841
[58] Field of Search ..................... 522/60, 904; 528/461, 528/462, 469; 525/370, 371; 524/800, 841

[56] References Cited

U.S. PATENT DOCUMENTS

| | | | |
|---|---|---|---|
| 2,374,789 | 5/1945 | Strain | 260/463 |
| 3,117,166 | 1/1964 | Harrison | 260/610 |
| 3,652,631 | 3/1972 | Stevens et al. | 260/453 |
| 3,879,353 | 4/1975 | Crawford | 260/77.5 |
| 3,935,243 | 1/1976 | Priddy | 260/463 |
| 4,119,657 | 10/1978 | Komai et al. | 260/453 |
| 4,304,882 | 12/1981 | D'Angelo et al. | 525/98 |

FOREIGN PATENT DOCUMENTS

| | | | |
|---|---|---|---|
| 0266966 | 5/1988 | European Pat. Off. | C07C 179/18 |
| 0364169 | 4/1990 | European Pat. Off. | C08G 67/00 |
| 0384660 | 8/1990 | European Pat. Off. | C08F 4/36 |
| 58-023807A | 2/1983 | Japan | C08F 4/32 |

OTHER PUBLICATIONS

English Translation Equivalent (which consists of pp. 1707–1711) for Zhurnal Organicheskoi Khimii, vol. 13, No. 9, pp. 1842–1846 (1977).

Chemical Abstracts, Physical Organic Chemistry, vol. 60, 5293d and 10892e (1964).

Primary Examiner—Mark Chapman
Attorney, Agent, or Firm—Ralph J. Mancini; Louis A. Morris

[57] ABSTRACT

The present invention relates to polymeric peroxycarbonates, a process for making the polymeric peroxycarbonates and initiator compositions comprising these polymeric peroxycarbonates. The polymeric peroxycarbonates of the present invention provide significant advantages in the polymerization of vinyl monomers.

9 Claims, No Drawings

POLYMERIC PEROXYCARBONATES AND PROCESS FOR MAKING THEM

The present invention relates to polymeric peroxycarbonates, a process for making the polymeric peroxycarbonates and initiator compositions comprising these polymeric peroxycarbonates. The polymeric peroxycarbonates of the present invention provide significant advantages in the polymerization of vinyl monomers.

Several types of polymeric peroxides are known in the prior art. For example, in Chemical Abstracts, Vol. 60, 5293d and 10892e (1964) one finds diacyl-type polymeric peroxides obtained by reaction of a chloride of an aliphatic dibasic acid and sodium peroxide. Ester-type polymeric peroxides are known, for example, from European Patent applications 0 384 660 and 0 364 169.

Further, from Zh. Org. Khim., Vol. 13, No. 9, page 1,842 (1977) it is known that the reaction of an aliphatic or aromatic dibasic acid chloride with 2,5-dimethylhexane-2,5-dihydroperoxide results in the production of the corresponding polymeric peroxy ester. A similar preparation process is also disclosed in U.S. Pat. No. 3,117,166.

Also known are a wide variety of polymers which contain several peroxide groups therein. Examples of acyl peroxide-containing polymers can be found in U.S. Pat. No. 4,304,882. Peroxycarbonate group-containing polymers can be found in Japanese patent application J5 8023-807 and U.S. Pat. No. 3,879,353. However, none of these publications discloses the peroxycarbonate polymers of the present invention.

None of the foregoing polymeric peroxides offer a combination of low-temperature initiation, storage stability and high molecular weight polymer products which is satisfactory for a wide range of applications. Accordingly, the present invention is directed to a specific peroxycarbonate polymer which exhibits a unique combination of properties which makes it particularly suitable for polymerization of vinyl monomers.

The present invention relates to a polymeric peroxycarbonate which comprises at least two structural units represented by the formula I:

Formula I $$\left[ \begin{array}{cccc} R_1 & R_1 & & \\ | & | & & \\ -C-R-C-O-O-C-O-R_3-O-C-O-O- \\ | & | & \| & \| \\ R_2 & R_2 & O & O \end{array} \right]$$

wherein R is selected from $C_1$–$C_6$ alkylene, alkyne, alkadiyne, 1,3-phenylene, 1,4-phenylene, cis- or trans-alkene, and alkadiene; $R_1$ and $R_2$ are independently selected from $C_1$–$C_6$ alkyl, $C_6$–$C_{10}$ aryl and $R_1$ and $R_2$ may combine to form a $C_3$–$C_{12}$ alkyl ring; and $R_3$ is selected from (A)–(F):

$$-R_6-\overset{R_4}{\underset{R_5}{\overset{|}{C}}}-R_6- \quad (A)$$

wherein $R_4$ and $R_5$ are independently selected from $C_1$–$C_6$ alkyl, $C_6$–$C_{10}$ aryl and $R_4$ and $R_5$ may combine to form a $C_3$–$C_{12}$ alkyl ring; $R_6$ is selected from methylene, 1,4-phenylene,

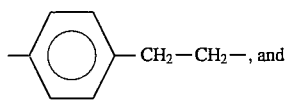

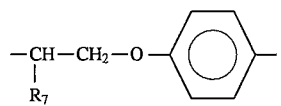

wherein $R_7$ is selected from hydrogen and methyl;

(B)

wherein $R_8$ is selected from nothing, methyl, ethyl and ethoxy;

(C)

wherein $R_8$ is as defined above;

(D)

wherein $R_9$ is nothing or methyl;

(E)

wherein $R_9$ is as defined above;

$$R_{10}-\overset{|}{C}H-\overset{|}{C}H_2 \quad (F)$$

wherein $R_{10}$ is selected from $C_3$–$C_{12}$ alkyl; 2-butenediyl-1,4; 2,4-hexadienediyl; 2-butynediyl-1,4; 2,4-hexadiynediyl-1,6; 3-hexynediyl-1,4; 3-methylpentadiyl-1,5; and —O—$R_3$—O— can be represented by

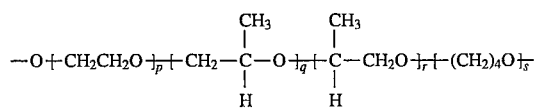

wherein p+q+r+s can be a value from 1 up to a value giving a maximum molecular weight of 10,000 grams/mole.

The present invention also relates to initiator compositions comprising one or more of the above-identified polymeric peroxycarbonates and a process for making these polymeric peroxycarbonates.

The closest peroxymonocarbonates to the structural unit of the formula I above are disclosed in European Patent application 0 266 966 and in U.S. Pat. Nos. 4,119,657 and 2,374,789. Further, bisperoxycarbonates are known from U.S. Pat. No. 3,652,631.

The polymeric peroxycarbonates of the present invention may take on one of two distinct forms. In one case, these materials are linear polymers having distinctive end groups which terminate the molecules. In a second embodiment, the repeating structural units are bound to themselves on both ends leading to a continuous molecule having no distinct beginning or end groups. Both of these types of molecules are encompassed within the scope of the present invention and both types are formed in the process of the present invention.

The more preferred polymeric peroxycarbonates of the present invention comprise at least three units of the formula I. Even more preferred are polymeric peroxycarbonates having a weight average molecular weight of from 500 to 50,000 grams/mole.

A more preferred group of the polymeric peroxycarbonates of the present invention can be represented by R is $-CH_2-CH_2-$, $-C\equiv C-$, meta-phenylene or para-phenylene, and $R_3$ is $-CH_2-CH_2-O-CH_2-CH_2-$, $(CH_2)_2$, $(CH_2)_4$ or $(CH_2)_6$.

In an alternative embodiment of the present invention, the polymeric peroxycarbonates comprising repeating units of the formula I are end-capped with one or more acid chlorides or chloroformates represented by the following formulas:

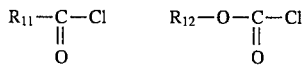

wherein $R_{11}$ and $R_{12}$ are independently selected from $C_{1-12}$ alkyl, $C_{2-12}$ alkenyl, $C_{3-8}$ cycloalkyl, $C_{6-12}$ aryl and $C_7-C_{12}$ aralkyl groups. End-capping is only applied to the linear-type polymeric peroxycarbonates which have distinct end groups.

The polymeric peroxycarbonates of the present invention are useful as polymerization initiators in the polymerization of unsaturated monomers. They may be used as such, or in an initiator composition which may comprise one or more additional initiators, anti-freeze ingredients, or may be in the form of a suspension or emulsion, thereby containing the necessary suspending agents and/or emulsifiers.

The present invention also relates to a process for making the abovementioned polymeric peroxycarbonates, which process is characterized by the step of reacting a dihydroperoxide of the formula II

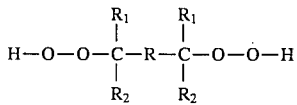

Formula II wherein R, $R_1$ and $R_2$ are as defined above; with a bischloroformate of the formula III:

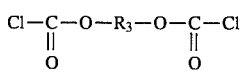

(Formula III)

wherein $R_3$ is as defined above. In general, one mole of the bischloroformate reacts with one mole of the dihydroperoxide. However, one may employ molar ratios of the reactants varying from 5:1 to 1:5 and still obtain reasonable yields of products in accordance with the present invention. Preferably, molar ratios between 0.5:1 and 1.5:1 are used.

The reaction is carried out at a temperature of 0°–50° C., and more preferably at a temperature of from 10°–30° C., in order to minimize decomposition of the peroxide moieties and undesirable side reactions. In addition, the reaction is carried out at a pH above 9 and more preferably at a pH of 11–14. Typical reaction times are on the order of 1–6 hours, depending upon the type and relative amounts of reactants employed and the degree of conversion or polymerization desired.

In order to maintain the pH of the reaction above 9, one may add a sufficient quantity of strong base such as sodium hydroxide, potassium hydroxide or other known strong bases. Sufficient strong base should be added prior to the reaction to create an environment with a pH above 9. Further strong base can be added immediately or during the reaction, as needed to maintain the pH level. pH levels of 13–14 have given the best results.

The above reaction can be carried out by contacting the two reactants in a basic environment. However, due to the polymerization reaction, the viscosity of the reaction product will continually increase. In order to ensure a good reaction, the reaction mixture should be continuously stirred. Accordingly, sufficient solvent should be employed to maintain the viscosity of the reaction mixture at a sufficiently low level so that the mixture can be stirred continuously.

Useful solvents include water and standard organic solvents such as aromatic solvents and ethers. Water and toluene are particularly preferred solvents for the present reaction.

Examples of dihydroperoxides according to the formula II which may be used in the process of the present invention include:

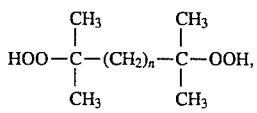

wherein n=1–4;

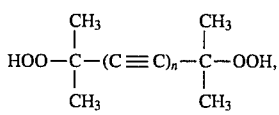

wherein n=1–2;

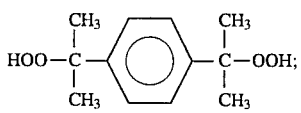

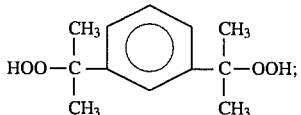

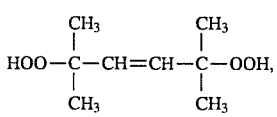

(cis or trans);

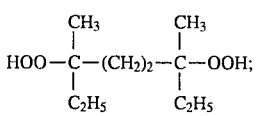

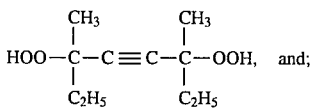

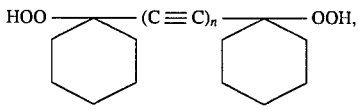

wherein n=1–2.

The bischloroformates of the present process may be derived from, for example, the following diols using known methods:

$$HO(CH_2)_nOH$$

wherein n=1-10;

$$HOCH_2-\underset{\underset{R^2}{|}}{\overset{\overset{R^1}{|}}{C}}-CH_2OH,$$

wherein $R^1$ is methyl and $R^2$ is selected from $C_1-C_4$ alkyl;

$$R^3-\underset{\underset{CH_3}{|}}{\overset{\overset{CH_3}{|}}{C}}-R^3,$$

wherein $R^3$ is selected from

—⟨phenyl⟩—OH, —⟨cyclohexyl⟩—OH,

—⟨phenyl⟩—OCH$_2$CH$_2$OH, and

—⟨phenyl⟩—OCH$_2$—$\underset{\underset{CH_3}{|}}{\overset{\overset{H}{|}}{C}}$—OH;

HO—⟨phenyl⟩—OH;

HOCH$_2$CH$_2$—O—⟨phenyl⟩—O—CH$_2$CH$_2$OH;

HOCH$_2$—⟨cyclohexyl⟩—CH$_2$OH; $R^{11}-\underset{\underset{OH}{|}}{\overset{\overset{H}{|}}{C}}-CH_2OH,$ wherein $R^{11}$ is selected from $C_1-C_{10}$ alkyl;

HOCH$_2$CH=CHCH$_2$OH;

HOCH$_2$—C≡C—CH$_2$OH;

$$HO-\underset{\underset{H}{|}}{\overset{\overset{CH_3}{|}}{C}}-C\equiv C-\underset{\underset{H}{|}}{\overset{\overset{CH_3}{|}}{C}}-OH;$$

$$HOCH_2CH_2-\underset{\underset{H}{|}}{\overset{\overset{CH_3}{|}}{C}}-CH_2CH_2OH;$$

HO[CH$_2$CH$_2$O]$_n$H, where n is selected to give a Mw up to 10000;

$$HO[CH_2-\underset{\underset{H}{|}}{\overset{\overset{CH_3}{|}}{C}}-O]_nH,$$

where n is selected to give a Mw up to 4000;

$$HO[CH_2CH_2O]_n[CH_2-\underset{\underset{H}{|}}{\overset{\overset{CH_3}{|}}{C}}-O]_mH,$$

where n and m are selected to give a Mw up to 10,000;

$$HO[CH_2CH_2O]_n[\underset{\underset{H}{|}}{\overset{\overset{CH_3}{|}}{C}}-CH_2O]_mH,$$

where n and m are selected to give a Mw up to 10,000;
HO[(CH$_2$)$_4$O]$_n$H, where n is selected to give a Mw up to 4500; and
HO[CH$_2$)$_4$O]$_n$[CH$_2$CH$_2$O] $_m$H, where n and m are selected to give a Mw up to 1250.

In addition, one may employ any one of the following commercially available bischloroformates:

$$Cl-\underset{\underset{O}{||}}{C}-OCH_2CH_2O-\underset{\underset{O}{||}}{C}-Cl;$$

$$Cl-\underset{\underset{O}{||}}{C}-O(CH_2)_4O-\underset{\underset{O}{||}}{C}-Cl;$$

$$CL-\underset{\underset{O}{||}}{C}-O-(CH_2)_6-O-\underset{\underset{O}{||}}{C}-Cl;$$

$$Cl-\underset{\underset{O}{||}}{C}-OCH_2CH_2OCH_2CH_2O-\underset{\underset{O}{||}}{C}-Cl;$$

$$Cl-\underset{\underset{O}{||}}{C}-O-CH_2CH_2OCH_2CH_2OCH_2CH_2O-\underset{\underset{O}{||}}{C}-Cl;\text{ and}$$

$$Cl-\underset{\underset{O}{||}}{C}-O-⟨phenyl⟩-\underset{\underset{CH_3}{|}}{\overset{\overset{CH_3}{|}}{C}}-⟨phenyl⟩-O-\underset{\underset{O}{||}}{C}-Cl.$$

A second consideration when working with peroxycarbonates is safety. Accordingly, we have found that maintenance of the active oxygen content of the products below 8.54 gives a relatively safe mixture which can be handled. Of course, good stirring during the reaction is extremely important from a safety standpoint since all generated heat must be efficiently dissipated to prevent self-propagating decomposition of the peroxycarbonates.

Typical products of the process are from 5–12% of monoperoxycarbonates comprising one unit of the formula I, and 88–95% of polymeric peroxycarbonates in accordance with the present invention wherein the molecule comprises at least two units of the formula I. Molecular weights of the products are generally widely distributed in a range between 500 and 50,000.

The following examples of the invention are provided for the purpose of illustration and description and are not to be construed as limiting the invention in any way. The scope of the invention is to be determined by the claims appended hereto.

EXAMPLE 1

A 1 liter beaker provided with a pH-electrode, stirrer and a thermometer is charged with 111.4 gr. (0.55 mole) of 2,5-dimethyl-2,5-dihydroperoxy hexane, 150 gr. demi-water, 150 gr. toluene and potassium hydroxide 45% solution to a pH of 14.0 keeping the temperature at 20° C. To the obtained mixture is added simultaneously, potassium hydroxide 45% solution and 115.5 gr. (0.5 mole) diethylene glycol bischloroformate over a 60 minute period keeping the pH at 14.0 and the temperature at 20° C. The reaction mixture is then stirred for an additional 45 minutes maintaining the pH at 13.0 by periodic additions of potassium hydroxide 45% solution. There follows 75 additional minutes of stirring at 20° C. during which period the pH falls from 13.0 to 12.0. Again, the pH is adjusted to 14.0 with potassium hydroxide and the reaction mixture is stirred for an additional 60 minutes. The total amount of potassium hydroxide added was 166.39 gr. (1.34 moles).

To the reaction mixture is added 100 ml of diethylether and the organic layer is separated. Subsequently, the organic layer is washed with 150 ml sodium hydroxide solution (4N) and 3 times with 100 ml. of demi-water. The organic layer is concentrated in vacuo at 20° C. and 1 mbar pressure, leaving a colorless residue having a weight of 174.8 gr. and an active oxygen content of 7.6%.

The structure was confirmed to be in accordance with the formula I by NMR and IR spectroscopy. GPC analysis (area/area) showed 8.19% of monoperoxycarbonate and 91.81% of polymeric peroxycarbonate in accordance with the present invention. Mw: 3308 and Mn: 1576.

EXAMPLE 2

A 1 liter beaker provided with a pH-electrode, stirrer and thermometer is charged with 115.3 gr. (0.55 mole) 2,5-dimethyl- 2,5-dihydroperoxy hexyne-3, 150 gr. demi-water, 150 gr. toluene and potassium hydroxide 45% solution to pH of 12.5 while maintaining the temperature at 20° C. To the obtained mixture is added simultaneously, potassium hydroxide 45% solution and 115.5 gr. (0.5 mole) diethylene glycol bischloroformate over a 50 minute period keeping the pH at 12.5 and the temperature at 20° C. After 60 minutes stirring of the reaction mixture at 20° C., potassium hydroxide 45% solution is added to increase the pH to 14.0 and stirring is continued for an additional 15 minutes at 20° C. The total amount of potassium hydroxide 45% solution added to the reaction mixture was 140.7 gr. (1.13 mole).

To the reaction mixture is now added 100 ml. diethyl ether and the organic layer is separated. The obtained organic layer is washed with 150 ml. sodium hydroxide (2N) and thereafter 3 times with 100 ml. demi-water. The organic layer is concentrated in vacuo at 20° C. and 1 mbar pressure, leaving a colorless residue having a weight of 178.2 gr. and an active oxygen content of 8%.

The structure of the products was confirmed to conform with the formula I by NMR and IR spectroscopy. GPC analysis showed 9.43% of monoperoxycarbonate and 90.57% of polymeric peroxycarbonate with a Mw: 5150 and Mn: 1345.

What is claimed is:

1. A polymeric peroxycarbonate which comprises at least two structural units represented by the formula I:

Formula I

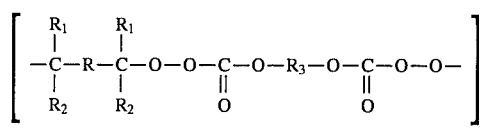

wherein R is selected from $C_1$–$C_6$ alkylene, alkyne, alkadiyne, 1,3-phenylene, 1–4 phenylene, cis-alkene, trans-alkene, or alkadiene; $R_1$ and $R_2$ are independently selected from $C_1$–$C_6$ alkyl, or $C_6$–$C_{10}$ aryl, and $R_1$ and $R_2$ my combine to form a $C_3$–$C_{12}$ alkyl ring; and $R_3$ is selected from (A)–(F):

(A)

wherein $R_4$ and $R_5$ are independently selected from $C_1$–$C_6$ alkyl, or $C_6$–$C_{10}$ aryl and $R_4$ and $R_5$ my combine to form a $C_3$–$C_{12}$ alkyl ring; $R_6$ is selected from methylene, 1,4-phenylene,

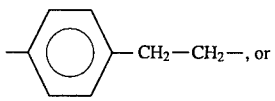

or

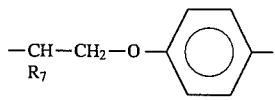

wherein $R_7$ is selected from hydrogen or methyl;

(B)

wherein $R_8$ is selected from nothing, ethyl or ethoxy;

(C)

wherein $R_8$ is as defined above;

(D)

wherein $R_9$ is nothing or methyl;

(E)

wherein $R_9$ is as defined above;

(F)

wherein $R_{10}$ is selected from $C_3$–$C_{12}$ alkyl, 2-butenediyl-1, 4, 2,2-hexadienediyl, 2-butynediyl- 1,4, 2,4-hexadiynediyl- 1,6, 3-hexynediyl-1,4, 3-methylpentadiyl-1,5, or —O—R$_3$—O can be represented by

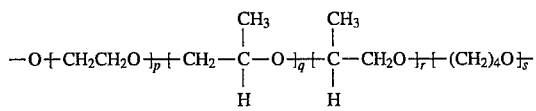

wherein p+q+r+s can be a value from 1 up to a value giving a maximum molecular weight of 10,000 grams/mole.

2. The polymeric peroxycarbonate of claim 1 wherein the peroxycarbonate comprises at least three units represented by the formula I.

3. The polymeric peroxycarbonate of claim 1 having an average molecular weight (Mw) between 500 and 50,000 grams/mole.

4. The polymeric peroxycarbonate of claim 1 which is end-capped with at least one of the following compounds:

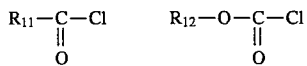

wherein R$_{11}$ and R$_{12}$ are independently selected from C$_{1-12}$ alkyl, C$_2$-C$_{12}$ alkenyl, C$_{3-8}$ cycloalkyl, C$_{6-12}$ aryl or C$_{7-12}$ aralkyl groups.

5. The polymeric peroxycarbonate of claim 1 wherein R$_3$ is CH$_2$—CH$_2$—O—CH$_2$—CH$_2$.

6. A free radical-generating agent which comprises a peroxycarbonate according to claim 1 as an active ingredient.

7. A process for the production of the polymeric peroxycarbonate of claim 1 which comprises the step of reacting a dihydroperoxide of the formula II,

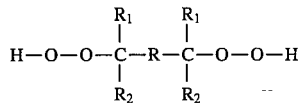

wherein R, R$_1$ and R$_2$ are as defined in claim 1 with a bischloroformate of the formula III:

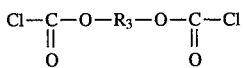

wherein R$_3$ is as defined in claim 1; at a temperature of 0°–50° C. and a pH above 9.

8. The process of claim 7 wherein the process is carried out in a solvent.

9. The process of claim 8 wherein sufficient solvent is employed such that the active oxygen content of the reaction products is maintained below 8.5%.

* * * * *

UNITED STATES PATENT AND TRADEMARK OFFICE
CERTIFICATE OF CORRECTION

PATENT NO. : 5,559,162
DATED : September 24, 1996
INVENTOR(S) : John Meijer, Petrus J. T. Alferink It is certified that error appears in the above—identified patent and that said Letters Patent is hereby corrected as shown below:

In claim 1, line 11, please change "my" to --may--.

In claim 1, line 20, please change "my" to --may--.

In claim 1, line 29, please change "
$$-CH-CH_2-O-\phantom{x}\bigcirc\phantom{x}$$
$$\phantom{xxx}|$$
$$\phantom{xxx}R_7$$
"

to -- 
$$-CH-CH_2-O-\phantom{x}\bigcirc\phantom{x}--$$
$$\phantom{xxx}|$$
$$\phantom{xxx}R_7$$

Signed and Sealed this

Sixteenth Day of September, 1997

Attest:

BRUCE LEHMAN

Attesting Officer     Commissioner of Patents and Trademarks